Figure 1:
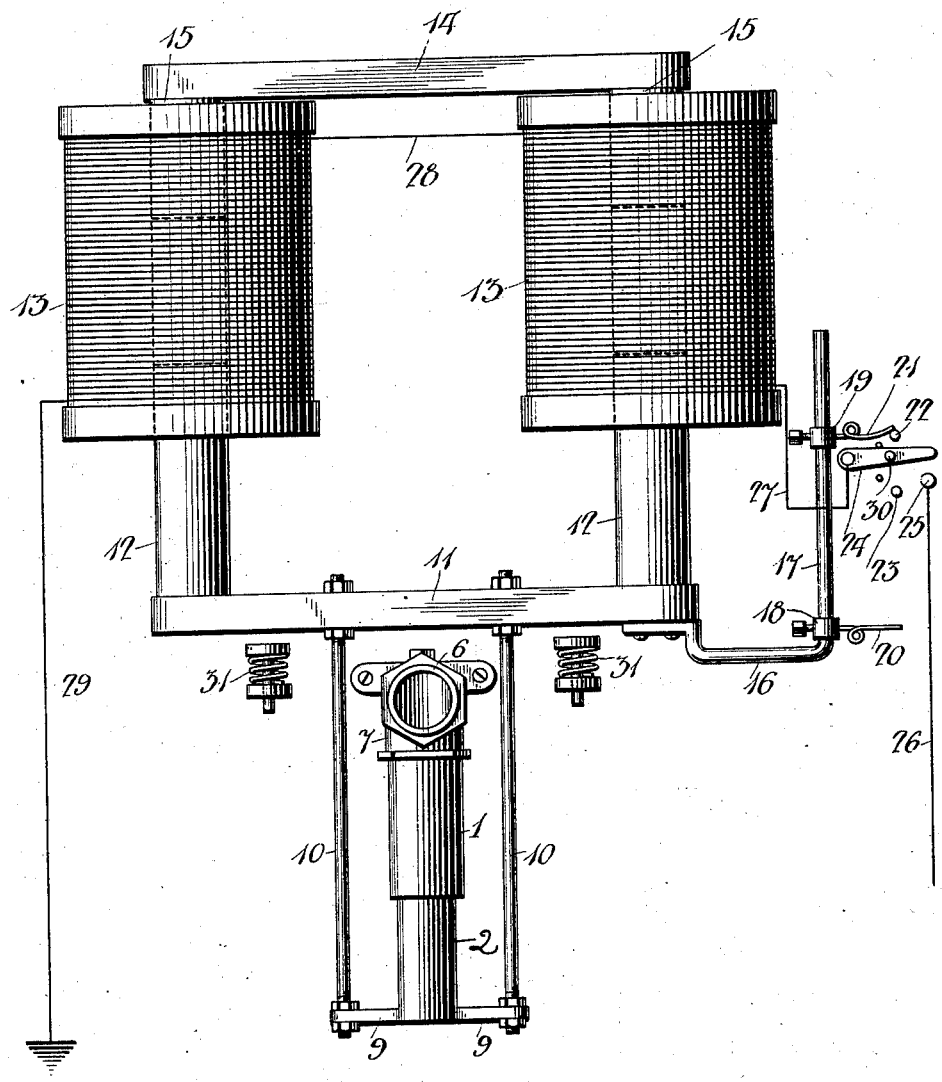

No. 752,643. PATENTED FEB. 23, 1904.
W. J. BELL.
ELECTRIC PUMP FOR SWITCHING MECHANISMS.
APPLICATION FILED JULY 31, 1903.
NO MODEL. 2 SHEETS—SHEET 1.

Witnesses

Inventor
Walter J. Bell,
By
His Attorneys

No. 752,643. PATENTED FEB. 23, 1904.
W. J. BELL.
ELECTRIC PUMP FOR SWITCHING MECHANISMS.
APPLICATION FILED JULY 31, 1903.
NO MODEL. 2 SHEETS—SHEET 2.
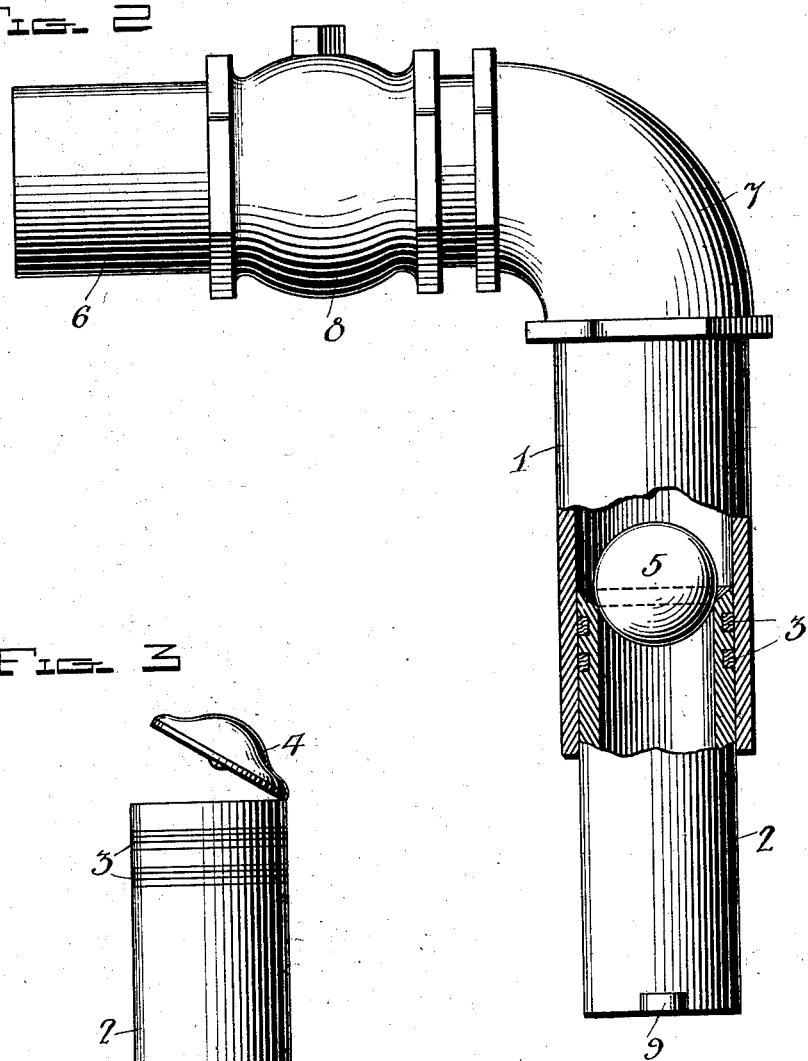
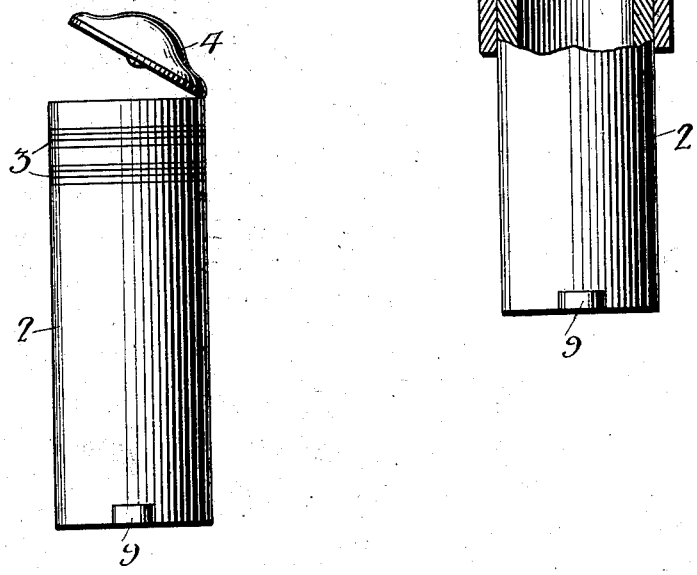
Witnesses
Inventor
Walter J. Bell,
By
his Attorneys No. 752,643. Patented February 23, 1904.

UNITED STATES PATENT OFFICE.

WALTER J. BELL, OF LOS ANGELES, CALIFORNIA, ASSIGNOR OF ONE-HALF TO LEON F. MOSS, OF LOS ANGELES, CALIFORNIA.

ELECTRIC PUMP FOR SWITCHING MECHANISMS.

SPECIFICATION forming part of Letters Patent No. 752,643, dated February 23, 1904.

Application filed July 31, 1903. Serial No. 167,727. (No model.)

*To all whom it may concern:*

Be it known that I, WALTER J. BELL, a citizen of the United States, residing at Los Angeles, in the county of Los Angeles and State of California, have invented certain new and useful Improvements in Electric Pumps for Switching Mechanisms; and I do hereby declare the following to be a full, clear, and exact description of the invention, such as will enable others skilled in the art to which it appertains to make and use the same.

My present invention is directed to improvements in electric pumps designed more particularly for use in the operation of switches of electric railways, the object of the invention being the production of a simple appliance adapted to supply fluid under pressure, preferably oil, to the switch-tongue-operating means, which may be a piston, and of a simple electrical mechanism including solenoid-magnets for operating said appliance, the current for the magnets being supplied from the trolley or feed wire in any suitable or preferred manner.

The invention in its preferred form of embodiment is fully and clearly set forth in the following detailed description, in connection with which reference is to be had to the accompanying drawings, in which—

Figure 1 is a front elevation of an electric pump embodying my invention. Fig. 2 is a side elevation of the pump proper. Fig. 3 is a modification of the pump-piston.

Referring to the drawings by numerals, 1 designates the pump-cylinder, in which is slidably arranged a hollow piston 2, open at both ends and provided with packing, as at 3. The pump is immersed at its lower end in a body of liquid, preferably oil, the oil being admitted to the cylinder by the open lower end of the piston. At the upper end of the piston is an inlet check-valve, which may be of the hinged type shown at 4, Fig. 3, but which preferably is in the form of a ball 5, Fig. 2, which ball-valve seats by gravity on the upper end of the piston and is free to be raised therefrom to admit oil to the cylinder in the downstroke of the piston.

6 denotes the fluid-pressure-conducting pipe, which leads to the switch-tongue-operating piston (not shown) and which is connected with the cylinder by an elbow 7. In the pipe 6 is a check-valve 8, which may be of the usual construction.

Fixed to the lower end of the piston are laterally-extending arms 9 9, and 10 10 are brass or other rods, which connect said arms with the yoke 11 of a pair of solenoid-magnet armatures 12 12, the latter extending in elevated position within the magnets 13 13 a distance equal, approximately, to two-thirds of the height of said magnets.

14 is a yoke connecting the magnet-cores 15 15, which latter extend into the magnets a distance equal to about one-third of the height of the magnets.

Fixed to the yoke 11 is a laterally-projecting arm 16, supporting at its outer end a vertical rod 17. On the rod are slidably mounted, through the medium of set-collars 18 19, two spring-arms 20 21, preferably intermediately coiled, as shown. In the path of the arm 21 is a pin 22, and 23 is a pin in the path of the arm 20. Between said pins is pivoted a switch-lever 24, movable between stop-pins, and 25 is a contact in the path of the free end of said contact-lever. A wire 26 connects said contact 25 with the feed-wire, (not shown,) and the switch-lever is connected at its pivotal point with one of the magnets 13 by a wire 27. Said magnet is connected with its companion magnet by a wire 28, and the latter magnet is grounded through a wire 29.

The downstroke of the piston by which oil is admitted to the cylinder is effected by gravity, and when near the end of said stroke the arm 21 snaps from the pin 22 against a pin or shoulder 30 on the switch-lever and drives the latter into engagement with the contact 25. Current is thereby caused to pass from the wire 26 through the contact 25 and switch-lever, through the wire 27 to and through the magnets, and from thence by the wire 29 to ground. The downstroke of the piston is limited by spring stops or buffers 31 31, preferably located in the path of the yoke 11, and during said downstroke the valve 5 or 4 is unseated, as will be understood. The magnets being energized the armatures are raised and the piston is elevated to force the oil contained in the cylinder through the medium of the seated valve through the pipe 6, the valve 8 being unseated by the pressure. When near the end of the upstroke of the piston, the arm 20 snaps from the pin 23 against the shoulder 30 on the switch-lever and forces the latter from engagement with the contact 25, thereby breaking the circuit through the magnets. The circuit being broken the piston moves downwardly by gravity until the circuit is again established in the manner above described.

I claim as my invention—

1. An electric pump comprised of a cylinder, a gravity-retracted piston, an armature connected with the piston, a solenoid-magnet for moving said armature, a switch-lever and arms movable with the piston for engaging and moving the switch-lever from opposite directions to make and break the magnet-circuit.

2. An electric pump comprised of a cylinder, a gravity-retracted piston, an armature connected with the piston, a solenoid-magnet for moving said armature, a pivoted switch-lever and adjustable spring-arms movable with the piston for engaging and moving the switch-lever from opposite directions to make and break the magnet-circuit.

3. An electric pump comprised of a cylinder, a gravity-retracted hollow piston, a check-valve at the upper end of the piston, an armature connected with the piston, a solenoid-magnet for moving said armature, and means including an automatically-moved switch-lever for making and breaking the magnet-circuit.

4. An electric pump comprised of a cylinder, a gravity-retracted hollow piston, a check-valve at the upper end of the piston, solenoid-magnets, armatures at said magnets, a yoke connecting the armatures and to which the piston is attached, spring-buffers receiving the impact of the downwardly-moving parts, and means including an automatically-moved switch-lever for making and breaking the magnet-circuit.

5. An electric pump comprised of a cylinder, a pump-piston, a solenoid-magnet, an armature connected with the piston, a rod carried by the armature, spring-arms adjustable on said rod, pins in the paths of said arms, a pivoted switch-lever between said pins and carrying a shoulder in the paths of said arms, and a contact in the path of movement of said switch-lever.

In testimony whereof I affix my signature in presence of two witnesses.

WALTER J. BELL.

Witnesses:
E. A. WATERMAN,
C. G. KELLOGG.